United States Patent [19]
Gross

[11] Patent Number: 5,977,907
[45] Date of Patent: Nov. 2, 1999

[54] METHOD AND SYSTEM FOR ANTENNA PATTERN SYNTHESIS BASED ON GEOGRAPHICAL DISTRIBUTION OF SUBSCRIBERS

[75] Inventor: Jonathan H. Gross, Gilbert, Ariz.

[73] Assignee: Motorola, Inc., Schaumburg, Ill.

[21] Appl. No.: 09/017,570

[22] Filed: Feb. 2, 1998

[51] Int. Cl.⁶ .................................................. H04B 7/185
[52] U.S. Cl. ............................................ 342/354; 342/352
[58] Field of Search ................................... 342/352, 354, 342/372, 373; 455/12.1, 33.1

[56] References Cited

U.S. PATENT DOCUMENTS

| | | | |
|---|---|---|---|
| 5,612,701 | 3/1997 | Diekelman | 342/354 |
| 5,754,139 | 5/1998 | Turcotte et al. | 342/373 |
| 5,856,804 | 1/1999 | Turcotte et al. | 342/371 |

Primary Examiner—Thomas H. Tarcza
Assistant Examiner—Dao L. Phan
Attorney, Agent, or Firm—Frank J. Bogacz

[57] ABSTRACT

A method and system for antenna pattern synthesis based on geographical distribution of subscribers allows more efficient use of satellite power resources in order to provide communications services to terrestrial-based subscribers (FIG. 1, 105, 115, 125, and 135). The method entails the grouping of terrestrial-based subscribers into communication beams (FIG. 5, 530) where gain is maximized (550) at the centroid of each beam. Additionally, gain in the directions of interfering emitters is minimized (540). A processor (FIG. 7, 740), which can be resident within a satellite (200), can perform the necessary processing to synthesize communication beams which service the terrestrial-based subscribers (105, 115, 125, and 135).

11 Claims, 3 Drawing Sheets

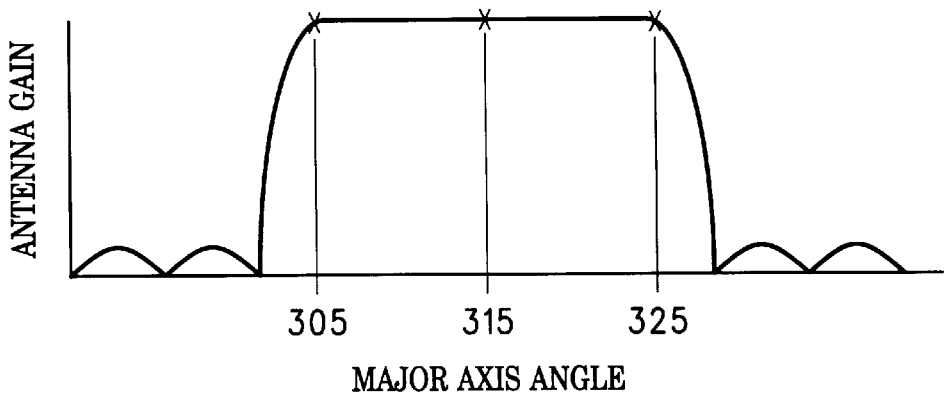
FIG. 4
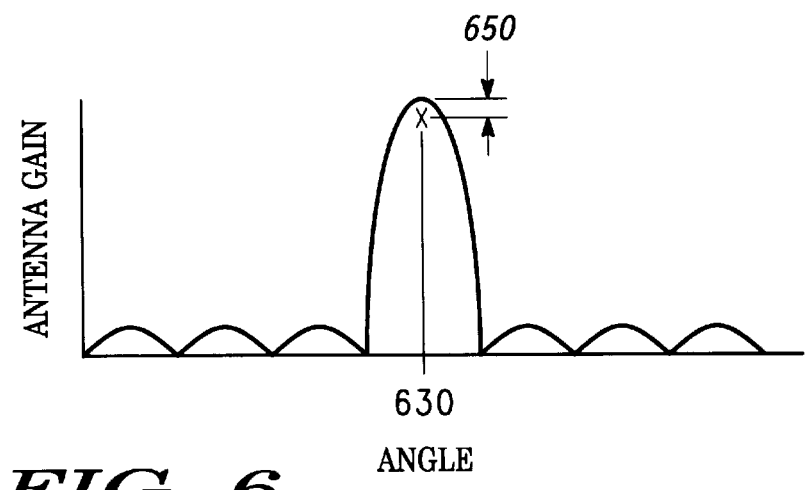
FIG. 6
FIG. 7
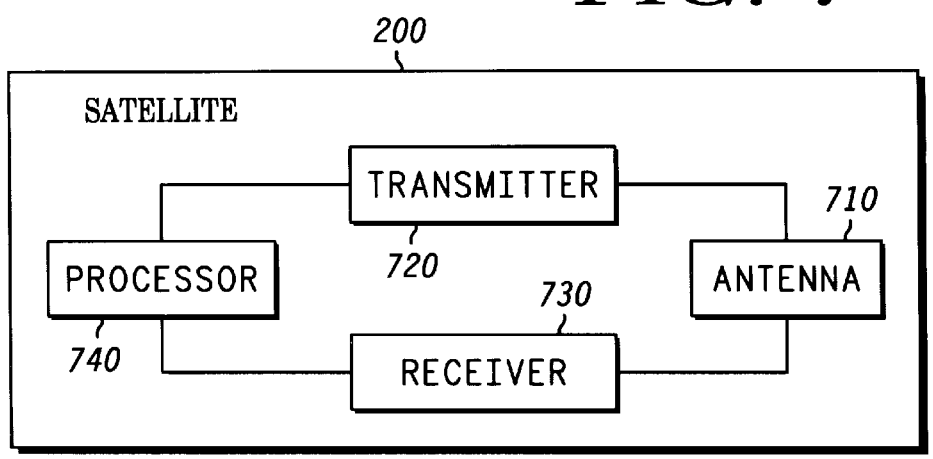

METHOD AND SYSTEM FOR ANTENNA PATTERN SYNTHESIS BASED ON GEOGRAPHICAL DISTRIBUTION OF SUBSCRIBERS

FIELD OF THE INVENTION

The invention relates generally to satellite communications and, more particularly, to methods of antenna beam synthesis.

BACKGROUND OF THE INVENTION

In a satellite communication system, information is exchanged between an orbiting satellite and one or more terrestrial-based subscribers. As the satellite moves over the terrestrial-based subscribers, it illuminates a part of the earth's surface using at least one directional antenna beam. The angular energy distribution pattern generated by the satellite antenna includes a main beam through which communication with the terrestrial-based subscribers is achieved. The pattern also includes a sidelobe region of reduced gain response which exists to the sides of the main beam. The main beam of the directional antenna pattern is referred to as the communication beam. The communication beam facilitates the bidirectional information exchange between the satellite and the terrestrial-based subscribers. This information can represent analog or digitized voice, facsimile data, digitized audio or video, internet data, or other type of subscriber information.

It is generally the case that the geographical distribution of terrestrial-based subscribers is not uniform across the surface of the earth. Subscribers tend to be concentrated within specific areas, with these areas separated by great distances. It is often true that the vast majority of terrestrial-based subscribers are concentrated within major metropolitan areas, along major roads and other thoroughfares, and other tightly bounded regions. Given this non-uniformity of subscriber density, it is advantageous to illuminate only those regions of the earth's surface which contain subscribers.

In a present day satellite communication system, such as the IRIDIUM® system, each communication beam subtends a fixed angular area. Each beam can be shared by multiple subscribers through the use of a unique frequency (in an FDMA system), or time slot (in a TDMA system), or may use another method of uniquely identifying the subscriber such as employing a unique spreading code in a CDMA system. Each of the unique divisions within a communication beam is referred to as a satellite channel. The satellite radiates a unique channel for each terrestrial-based subscriber of the satellite system when the subscriber is engaged in a call. In a system such as IRIDIUM®, a beam can cover an area hundreds of miles wide.

Communication beams are generated by the satellite in response to as few as a single subscriber requiring connection with the satellite. It is generally desirable to provide as few communication beams as possible in order to minimize the resources required by the satellite to conduct communications with the terrestrial based subscribers. However, given that subscribers may be distributed over a wide geographical area, many beams must be generated by the satellite in order to provide connectivity with each of the terrestrial-based subscribers. This results in some of the energy from the satellite being radiated onto areas which do not contain subscribers. This increases the demand on the satellite resources needed to generate and maintain the communication beams.

An additional drawback to the use of communication beams which subtend a fixed angular area, is the relative difficulty for the satellite system to selectively avoid interference from terrestrial-based interfering stations. Since the communication beam generally possesses a defined pattern which includes a fixed main beam gain value as well as defined sidelobe levels, it is often difficult to overlay the maximum gain portion of the beam on an area which contains subscribers while simultaneously placing a minimum gain portion of the beam, such as a sidelobe, on an area which contains an interfering station. This can have the effect of reducing the quality of service provided to the terrestrial-based subscribers.

Therefore, what are needed are a method and system for overlaying high gain portions of a communication beam on specific geographical areas while overlaying minimum gain portions of a communication beam on other geographical areas. Such a system would provide increased efficiency in the use of satellite resources and provide a higher quality of service to those subscribers proximate with interfering stations.

BRIEF DESCRIPTION OF THE DRAWINGS

FIG. 4 illustrates an antenna gain pattern along the major axis of a communication beam with an elliptical footprint synthesized in accordance with a preferred embodiment of the present invention;

FIG. 6 illustrates a gain pattern wherein the calculation for the element coefficients for the communication beam has included a tolerance factor in accordance with an alternate embodiment of the invention; and FIG. 7 illustrates a candidate system for executing the method of FIG. 5 in accordance with a preferred embodiment of the present invention.

DETAILED DESCRIPTION OF THE DRAWINGS

A method and system for antenna pattern synthesis based on the geographical distribution of subscribers has the advantage of efficiently utilizing satellite resources in order to provide communication services to terrestrial-based users. A satellite communication system having this capability enables connectivity between the satellite and a group of terrestrial-based subscribers in a lower cost fashion than previously possible. Additionally, as an individual communication beam is formed and steered toward a terrestrial based subscriber, the antenna pattern can be shaped so as to minimize any interference from terrestrial-based in-band emitters. This allows a communication beam having maximum gain to be overlaid on a group of terrestrial-based subscribers, while a minimum gain portion is overlaid on those locations where interference from terrestrial-based in-band emitters are present. This results in a signal having a lower noise content being received at the satellite. This, in turn, results in a higher quality of service being provided to the terrestrial-based subscribers.

Figure 1:
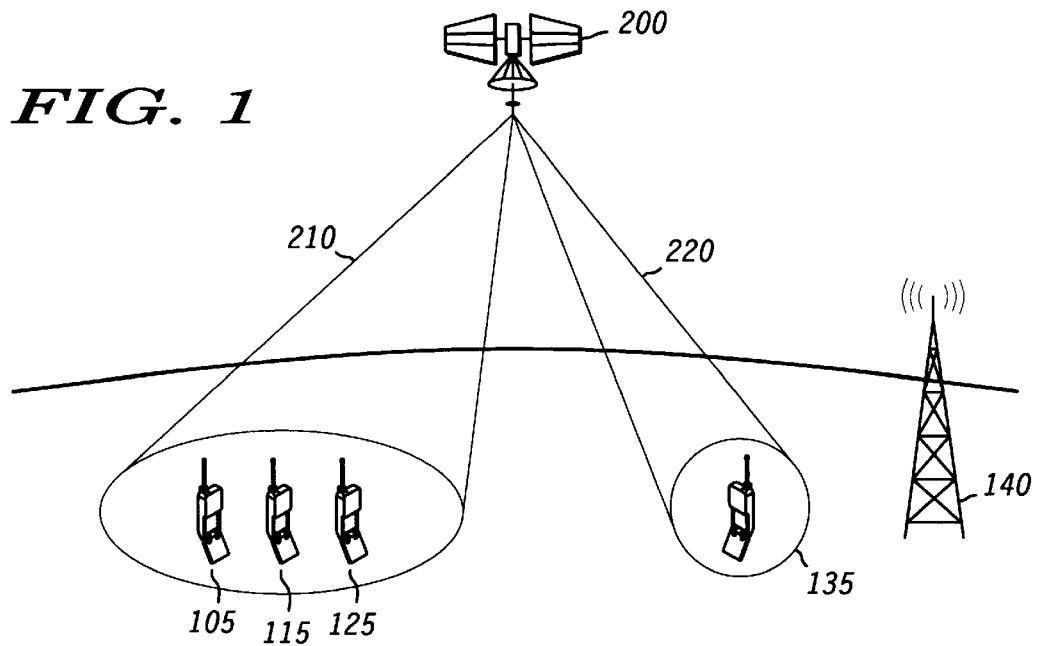
FIG. 1 illustrates an approach toward beamforming and steering to groups of terrestrial based subscribers in accordance with a preferred embodiment of the invention.

FIG. 1 illustrates an approach toward beamforming and steering to groups of terrestrial based subscribers in accordance with a preferred embodiment of the invention. In FIG. 1, satellite 200 establishes and maintains communication with terrestrial-based subscribers 105, 115, 125, and 135. Satellite 200 can be orbiting in either a non-geostationary or geostationary orbit.

Communication of satellite 200 with terrestrial-based subscribers 105, 115, and 125, is provided through communication beam 210. Communication with subscriber 135 is provided through communication beam 220. In FIG. 1, communication beam 210 has been formed to illuminate an elliptical area on the earth's surface which encompasses only the immediate area surrounding terrestrial-based subscribers 105, 115, and 125. Communication beam 220 has been formed so as to encompass only the immediate geographical area which contains subscriber 135. In addition to radiating communication beams 210 and 220, satellite 200 also radiates a sidelobe region which overlays onto the geographical area occupied by interfering station 140. Through the judicious sizing of communication beams 210 and 220, and placement of the sidelobes, only those geographical areas which contain subscribers are illuminated. Additionally, the effect of interfering emitters, such as interfering station 140, is minimized.

Satellite 200 desirably incorporates a plurality of receive and transmit antenna elements which function as a planar, two dimensional, phased array. Each antenna element can be of any type or construction such as a dipole, monopole above a ground plane, patch, or any other conductive element which radiates an electromagnetic wave as a function of the electrical current present on the surface of the element. Additionally, the antenna elements can also be of the aperture type such as a waveguide slot, horn, or any other type of nonconducting element which radiates an electromagnetic wave as a function of the electric field present within an aperture. Further, the elements which comprise the antenna of satellite 200 can be either active or passive in nature.

It is desirable for the antenna elements of satellite 200 to be arranged as a planar, two dimensional, phased array with reciprocal transmit and receive antenna patterns. The use of a planar two-dimensional phased array provides the capability to form a main beam which projects a circular or elliptical footprint on the ground. The main beam footprint can be constricted or broadened in order to encompass the area occupied by the terrestrial-based subscribers. In the case of an elliptical main beam, the orientation of the ellipse, as well as the lengths of the major and minor axes, can be adjusted in order to encompass the area occupied by the group of terrestrial-based subscribers. Beams of other shapes may also be possible. It is also desirable that the antenna of satellite 200 be capable of generating more than one antenna pattern by way of the superposition of two or more currents or voltages on each of the constituent elements.

Alternatively, the antenna elements of satellite 200 can be arranged as a non-planar phased array. This arrangement may entail more complexity in the control of the amplitude and phase of each of the antenna elements, but may not require the use of a large, substantially flat, surface on which to place the antenna elements.

Figure 2:
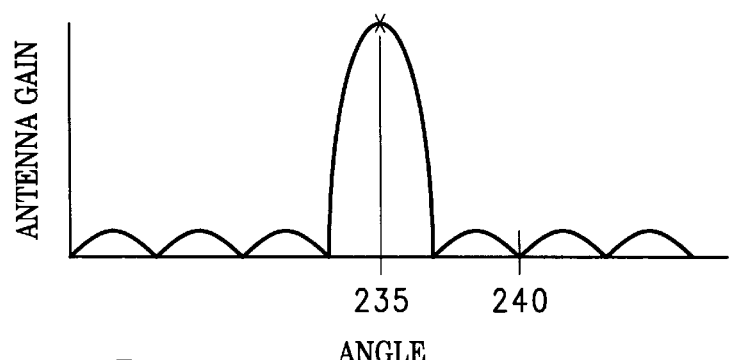
FIG. 2 illustrates a first antenna gain pattern for a communication beam with a circular footprint synthesized in accordance with a preferred embodiment of the invention.

FIG. 2 illustrates a first antenna gain pattern for a communication beam with a circular footprint synthesized in accordance with a preferred embodiment of the invention. The vertical axis of FIG. 2 indicates a measure of antenna gain for a particular antenna pattern synthesized by the antenna of satellite 200. The horizontal axis of FIG. 2 indicates an angular displacement referenced to an arbitrary direction from the satellite to a point which represents a group of terrestrial based subscribers. Referring to FIG. 1, communication beam 220 has been constrained in order to provide maximum gain in the direction of terrestrial based subscriber 135, and to provide minimum gain in the direction of interfering station 140. The angle from the arbitrary reference point to terrestrial based subscriber 135 is indicated by gain point 235 (FIG. 2), while the angle from the arbitrary reference angle to interfering station 140 is indicated by gain point 240 (FIG. 2).

Figure 3:
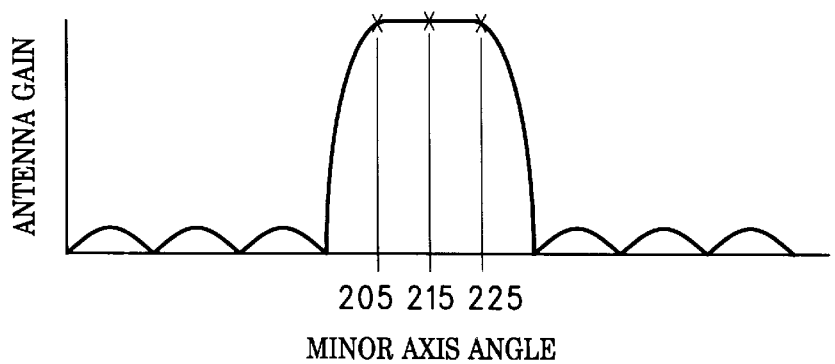
FIG. 3 illustrates an antenna gain pattern along the minor axis of a communication beam with an elliptical footprint synthesized in accordance with a preferred embodiment of the present invention.

FIG. 3 illustrates an antenna gain pattern along the minor axis of an antenna pattern with an elliptical footprint in accordance with a preferred embodiment of the present invention. Referring also to FIG. 1, communication beam 210 has been constrained to provide the maximum gain in the minor axis of an ellipse in the direction of terrestrial-based subscribers 105, 115, and 125. The angles from an arbitrary reference point along the minor axis of an ellipse to terrestrial-based subscriber 105, 115, and 125 are indicated in FIG. 3 by 205, 215, and 225, respectively.

FIG. 4 illustrates an antenna gain pattern along the major axis of a communication beam with an elliptical footprint in accordance with a preferred embodiment of the present invention. Referring also to FIG. 1, communication beam 210 has been constrained to provide the maximum gain in the major axis of an ellipse in the direction of terrestrial-based subscribers 105, 115, and 125. The angles from an arbitrary reference point along the major axis of an ellipse to terrestrial-based subscribers 105, 115, and 125 are indicated in FIG. 4 by 305, 315, and 325, respectively.

Figure 5:
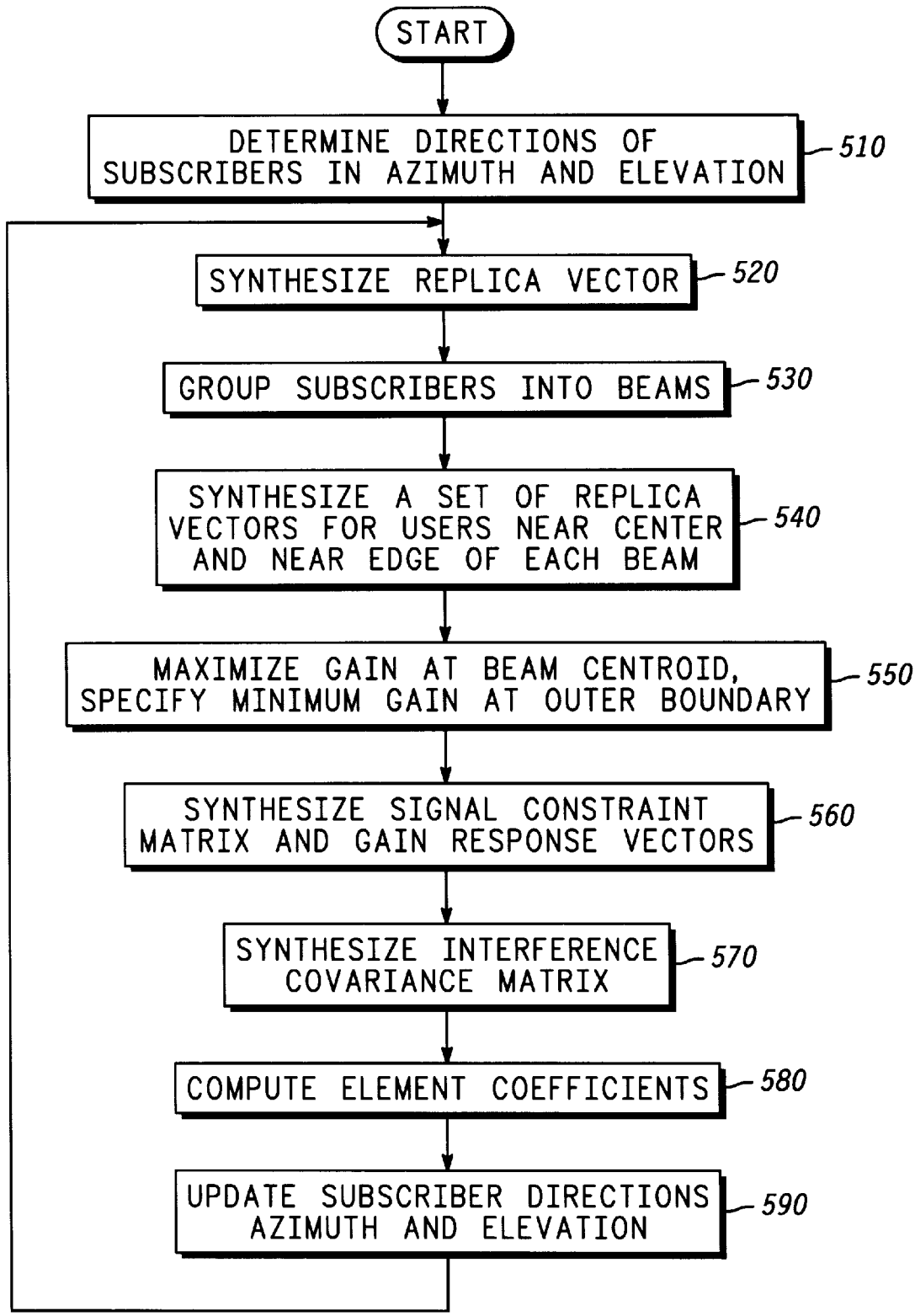
FIG. 5 illustrates a method for synthesizing an antenna pattern based on the geographical distribution of subscribers in accordance with a preferred embodiment of the present invention.

FIG. 5 illustrates a method for synthesizing an antenna pattern based on the geographical distribution of subscribers in accordance with a preferred embodiment of the present invention. Through the use of the method of FIG. 5, antenna patterns having the characteristics illustrated in FIGS. 2, 3, and 4 can be realized. The method begins with step 510 in which the satellite determines the directions from the satellite to a plurality of terrestrial-based subscribers. Desirably, he directions are expressed in the form of azimuth and elevation angles as referenced from the satellite, although other coordinate systems can be used. In step 520, a replica vector is synthesized. The replica vector contains the phase information at each antenna element for a signal arriving from a particular direction. The replica vector is unique for each angle of arrival. For example, a signal arriving from an azimuth and elevation angle of zero might result in a replica vector with unit amplitude and zero phase for each antenna element. Additionally, this is the only angle that would result in this replica vector.

In step 530, the terrestrial-based subscribers are grouped into communication beams based on the directions in azimuth and elevation as determined in step 510. In step 530, the satellite determines the number of beams which are required to provide communication between the satellite and the terrestrial-based subscribers. The number of beams is limited by the capability of the satellite beamforming equipment.

The determination of the number of beams is also subject to the gain requirements of each communication beam. For subscribers located directly beneath the satellite, a lower gain communication beam can be used. For subscribers located toward the edge of the satellite antenna field of view, a higher gain communication beam may be desired. Therefore, it can be true that when a group of subscribers is directly beneath the satellite, a single, low gain, communication beam will suffice. As the satellite moves in its orbit and the group of subscribers approach the edge of the antenna field of view, it may be necessary to create several, higher gain "pencil" beams. In this case, each communication beam provides service to a subset of the original group of subscribers.

In step 540, a set of replica vectors is synthesized for those terrestrial-based subscribers located within a communication beam. As previously mentioned, the replica vector contains the phase information for each of the antenna elements which comprise the satellite antenna. For the terrestrial-based subscribers located within each main beam, the replica vectors are denoted as $d_s(k)$. For those terrestrial-based subscribers located outside of the area of the communication beam, including any in-band interfering emitters, the replica vectors are denoted as $d_i(m)$.

In step 550, the gain is maximized at the centroid of each beam. Additionally, a minimum gain for each terrestrial-based subscriber located at the edge of each communication beam is also specified. The resulting gain parameter for each terrestrial-based subscriber within a communication beam is identified as $g_s(k)$. For those subscribers outside of the area of a communication beam, as well as any interfering emitters, the gain parameter is specified as $g_i(m)$.

In step 560, a signal constraint matrix, C, and a gain response vector, g, are synthesized, resulting in the following two matrices:

$$c=[d_s(1)d_s(2)\ldots d_s(N_s)]$$

$$g_c=[g_s(1)g_s(2)\ldots g_s(N_s)]^T$$

Where $N_s$ denotes the number of user locations which define the beam centroid and the beam perimeter. The superscript "T" denotes the transpose of the matrix.

In step 570 the interference covariance matrix, $R_I$, is synthesized:

$$R_I=\Sigma_m g_I(m)d_I(m)d_I^H(m)$$

Where the summation includes the number of interfering emitters, m, and the superscript "H" denotes the Hermitian transpose of the vector $d_I(m)$. The matrix $R_I$ then contains a measure of the relative strength of the interfering emitters.

In step 580, the element coefficients, w, are computed. Each coefficient generally contains both an amplitude and phase value.

$$w=(R_I+I)^{-1}C[C^H(R_I+I)^{-1}]^{-1}g_c$$

The element coefficients are applied to the antenna elements which comprise the satellite antenna in order to form a communication beam which covers an immediate area occupied by the plurality of terrestrial-based subscribers. The communication beam will also possess reduced gain in the direction of any interfering emitters.

Step 590, which desirably occurs after the satellite has moved in its orbit, is executed to compensate for such satellite motion. In step 590, the directions of the terrestrial-based subscribers are updated relative to the satellite coordinate system. The method then returns to step 520 where a new replica vector is calculated.

In accordance with an alternate embodiment of the invention, a tolerance factor can be added in the calculation for the element coefficients in step 580. This tolerance factor can be used to allow some variation in the synthesis of the gain pattern. The tolerance factor can be useful in that it relaxes the gain constraint which can allow faster calculation of the element coefficients and synthesis of the communication beam. The tolerance factor can be dynamic and assigned only when the satellite-to-ground or ground-to-satellite link budget permit. With the tolerance factor included, the calculation for the element coefficients, as in step 520, can be expressed as:

$$w=(R_I+I)^{-1}C[C^H(R_I+I)^{-1}C+\xi I]^{-1}g_c$$

The tolerance factor, $\xi$, is desirably multiplied by an identity matrix, I, in order to ensure that it is expressed in matrix form.

FIG. 6 illustrates a gain pattern wherein the calculation for the element coefficients for the communication beam has included a tolerance factor in accordance with an alternate embodiment of the invention. In FIG. 6, the main beam gain at an angle 630 has been allowed to vary by an amount $\xi$, denoted by 650. Note that although some variation in the gain response of the communication beam has been allowed, the overall antenna gain pattern still exhibits the desired directional properties.

FIG. 7 illustrates a candidate system for executing the method of FIG. 5 in accordance with a preferred embodiment of the present invention. In FIG. 7, antenna 710, located in satellite 200, desirably radiates energy to and receives energy from one or more terrestrial-based subscribers. Antenna 710 can comprise a beamformer assembly which provides signals to the elements of antenna 710 with the proper phase and amplitude weighting.

Satellite 200 also comprises transmitter 720 and receiver 730 which are coupled to antenna 710. Transmitter 720 transmits radio frequency energy at a sufficient level to be received by the terrestrial-based subscribers. Receiver 730 receives and amplifies signals which originate from terrestrial-based subscribers. Processor 740, also located within satellite 200, determines the number of communication beams required to enable communication between the satellite and the plurality of terrestrial-based subscribers based on a geographical distribution of the subscribers. Processor 740 also performs the processing tasks discussed in reference to FIG. 5, although some or all of those processing tasks could be performed by other remote or co-located devices in alternate embodiments.

In an alternate embodiment of the present invention, processor 740 may be located outside satellite 200 in a terrestrial-based facility such as a satellite ground station or other fixed station which has been assigned the role of performing antenna beam synthesis for satellite-to-ground communications with terrestrial-based subscribers.

In summary, the method and system of the present invention enable communication beam steering and beam shaping to be optimized according to the distribution of terrestrial-based subscribers. Additionally, the invention maximizes the gain of the satellite antenna array, subject to communication beam response constraints. These two properties provide improved radiated power efficiency for spatially nonuniform traffic distributions which improves system capacity. Further, the invention minimizes the sidelobe levels in the directions of the interferers which maximizes the spectral efficiency and improves the quality of service that can be provided to terrestrial-based subscribers.

While the principles of the invention have been described above in connection with a specific apparatus, it is to be clearly understood that this description is made only by way of example and not as a limitation of the scope of the invention. Accordingly, it is intended by the appended claims to cover all modifications of the method and system of the present invention that fall within the true spirit and scope of the invention.

What is claimed is:

1. A method for enabling communication between a satellite comprising a plurality of antenna elements which operate as a phased array, and a plurality of terrestrial-based subscribers distributed across a geographical area, the method comprising:

(a) determining directions from the satellite to the plurality of terrestrial-based subscribers;

(b) grouping the plurality of terrestrial-based subscribers to a communication beam based on the directions;

(c) synthesizing a signal constraint matrix based on said grouping;

(d) forming a communication beam which covers an area occupied by the plurality of terrestrial-based subscribers based on the signal constraint matrix.

2. The method claimed in claim 1, wherein step (d) comprises the step of performing a calculation of coefficients which are applied to at least one of the plurality of antenna elements.

3. The method claimed in claim 2, wherein step (d) further comprises the step of adding a tolerance factor in the calculation.

4. The method claimed in claim 1, wherein step (d) comprises the step of synthesizing a signal constraint matrix.

5. The method claimed in claim 1, wherein step (d) comprises the step of synthesizing an interference covariance matrix.

6. The method claimed in claim 1, wherein the method is performed in the satellite.

7. A system for forming a plurality of communication beams which enables communication between a satellite and a plurality of terrestrial-based subscribers comprising:

a plurality of antenna elements which receive radio signals from the plurality of terrestrial-based subscribers; and a processor which determines a number of communication beams required to enable communication between the satellite and the plurality of terrestrial-based subscribers based on a geographical distribution of the plurality of terrestrial-based subscribers, wherein the processor synthesizes a signal constraint matrix and forms the communication beams based on the signal constraint matrix.

8. The system claimed in claim 7, wherein the system additionally comprises a transmitter which transmits radio frequency energy to the plurality of terrestrial-based subscribers.

9. The system claimed in claim 7, wherein the system additionally comprises a receiver which receives and amplifies signals which originate from the plurality of terrestrial-based subscribers.

10. The system claimed in claim 7, wherein the system comprises a satellite in a non-geostationary orbit.

11. The system claimed in claim 7, wherein the system comprises a satellite in a geostationary orbit.

* * * * *